United States Patent
Lee et al.

(10) Patent No.: US 10,356,582 B2
(45) Date of Patent: Jul. 16, 2019

(54) METHOD FOR CHANGING SYSTEM INFORMATION, AND APPARATUS THEREFOR

(71) Applicant: KT CORPORATION, Gyeonggi-do (KR)

(72) Inventors: KyungJun Lee, Seoul (KR); Seunghyun Kang, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/573,563

(22) PCT Filed: May 13, 2016

(86) PCT No.: PCT/KR2016/005115
§ 371 (c)(1),
(2) Date: Nov. 13, 2017

(87) PCT Pub. No.: WO2016/182401
PCT Pub. Date: Nov. 17, 2016

(65) Prior Publication Data
US 2018/0152822 A1    May 31, 2018

(30) Foreign Application Priority Data
May 14, 2015  (KR) .......... 10-2015-0067628
May 13, 2016  (KR) .......... 10-2016-0058751

(51) Int. Cl.
*H04W 4/70*  (2018.01)
*H04W 72/04*  (2009.01)
(Continued)

(52) U.S. Cl.
CPC ............. *H04W 4/70* (2018.02); *H04W 48/12* (2013.01); *H04W 72/042* (2013.01); *H04W 4/90* (2018.02);
(Continued)

(58) Field of Classification Search
CPC ......... H04W 4/70; H04W 4/08; H04W 68/00; H04W 8/186
See application file for complete search history.

(56) References Cited

U.S. PATENT DOCUMENTS 8,630,216 B2 *  1/2014  Deivasigamani ......... H04L 1/08
                                                      370/252
9,603,065 B2 *  3/2017  Nory ..................... H04W 48/10
(Continued)

FOREIGN PATENT DOCUMENTS

| WO | 2011/112051 A2 | 9/2011 |
| WO | 2014/185659 A1 | 11/2014 |
| WO | 2015/046853 A1 | 4/2015 |

*Primary Examiner* — Chandrahas B Patel
(74) *Attorney, Agent, or Firm* — IP Legal Services, LLC

(57) ABSTRACT

Provided are a method and an apparatus, for changing system information by an MTC UE. The method may include receiving system information block 1bis (SIB 1bis) for the MTC UE; confirming a change in system information by using at least one from among a count value of the system information, which is included in the system information block 1bis, and system information change indicator information; and receiving at least one system information message which includes changed system information.

12 Claims, 12 Drawing Sheets

(51) Int. Cl.
*H04W 48/12* (2009.01)
*H04W 52/02* (2009.01)
*H04W 4/90* (2018.01)

(52) U.S. Cl.
CPC ..... *H04W 52/0209* (2013.01); *Y02D 70/1224* (2018.01); *Y02D 70/1226* (2018.01); *Y02D 70/1262* (2018.01); *Y02D 70/1264* (2018.01); *Y02D 70/21* (2018.01); *Y02D 70/24* (2018.01)

(56) References Cited

U.S. PATENT DOCUMENTS

| | | |
|---|---|---|
| 9,992,695 B2* | 6/2018 | Axmon .................. H04W 24/10 |
| 2012/0329485 A1 | 12/2012 | Lee et al. |
| 2013/0035064 A1 | 2/2013 | Balachandran et al. |
| 2013/0225169 A1 | 8/2013 | Farnsworth et al. |
| 2016/0088595 A1 | 3/2016 | You et al. |
| 2016/0119900 A1 | 4/2016 | You et al. |

* cited by examiner

FIG.5

SystemInformationBlockType1bis message

```
-- ASN1START
SystemInformationBlockType1bis ::=   SEQUENCE {
    cellAccessRelatedInfo           SEQUENCE {
        plmn-IdentityList               PLMN-IdentityList,
        trackingAreaCode                TrackingAreaCode,
        cellIdentity                    CellIdentity,
        cellBarred                      ENUMERATED (barred, notBarred),
        intraFreqReselection            ENUMERATED (allowed, notAllowed),
        csg-Indication                  BOOLEAN,
        csg-Identity                    CSG-Identity          OPTIONAL  -- Need OR
    },
    cellSelectionInfo               SEQUENCE {
        q-RxLevMin                      Q-RxLevMin,
        q-RxLevMinOffset                INTEGER (1..8)        OPTIONAL  -- Need OP
    },
    p-Max                           P-Max                     OPTIONAL, -- Need OP
    freqBandIndicator               FreqBandIndicator,
    schedulingInfoList              SchedulingInfoList,
    tdd-Config                      TDD-Config                OPTIONAL, -- Cond TDD
    si-WindowLength                 ENUMERATED {
                                        ms1, ms2, ms5, ms10, ms15, ms20, ms40},
    systemInfoValueTag              INTEGER (0..31),
    systemInfoUpdateBitmap          BIT STRING (SIZE (10))    OPTIONAL  -- Need OR
    multiBandInfoList               MultiBandInfoList         OPTIONAL, -- Need OR
    freqBandIndicator-v9e0          FreqBandIndicator-v9e0    OPTIONAL, -- Cond FBI-max
    multiBandInfoList-v9e0          MultiBandInfoList-v9e0    OPTIONAL, -- Cond mFBI-max
    ims-EmergencySupport-r9         ENUMERATED (true)         OPTIONAL, -- Need OR
    cellSelectionInfo-v920          CellSelectionInfo-v920    OPTIONAL, -- Cond RSRQ
    tdd-Config-v1130                TDD-Config-v1130          OPTIONAL, -- Cond TDD-OR
    cellSelectionInfo-v1130         CellSelectionInfo-v1130   OPTIONAL, -- Cond WB-RSRQ
    cellAccessRelatedInfo-v1250     SEQUENCE {
    categoryAllowed-r12             ENUMERATED (true)         OPTIONAL  -- Need OP
    }
    ...
}
```

FIG. 7

SystemInformationBlockType1bis message

```
SchedulingInfoList ::= SEQUENCE (SIZE (1..maxSI-Message)) OF SchedulingInfo

SchedulingInfo ::=      SEQUENCE {
  si-Periodicity            ENUMERATED {
                              rf8, rf16, rf32, rf64, rf128, rf256, rf512},
  sib-MappingInfo           SIB-MappingInfo,
  updateTag                 ENUMERATED {true}              OPTIONAL    -- Need OR
}

SIB-MappingInfo ::= SEQUENCE (SIZE (0..maxSIB-1)) OF SIB-Type

SIB-Type ::=      ENUMERATED {
                    sibType3bis, sibType4bis, sibType5bis, sibType6bis,
                    sibType7bis, sibType8bis, sibType9bis, sibType10bis,
                    sibType11bis, sibType12bis, sibType13bis,
                    sibType14bis, sibType15bis,
                    sibType16bis, sibType17bis, sibType18bis,
                    ..., sibType19bis}
```

FIG.9

*SystemInformationBlockType1bis message*

```
SchedulingInfoList ::= SEQUENCE (SIZE (1..maxSI-Message)) OF SchedulingInfo
SchedulingInfo ::=    SEQUENCE {
  si-Periodicity        ENUMERATED {
                          rf8, rf16, rf32, rf64, rf128, rf256, rf512},
  sib-MappingInfo       SIB-MappingInfo,
  eCIndication(등 repetition)  ENUMERATED {true}    OPTIONAL  -- Need OR
}
SIB-MappingInfo ::= SEQUENCE (SIZE (0..maxSIB-1)) OF SIB-Type SIB-Type ::=          ENUMERATED {
                        sibType3bis, sibType4bis, sibType5bis, sibType6bis,
                        sibType7bis, sibType8bis, sibType9bis, sibType10bis,
                        sibType11bis, sibType12bis, sibType13bis,
                        sibType14bis, sibType15bis,
                        sibType16bis, sibType17bis, sibType18bis,
                        ..., sibType19bis}
```

METHOD FOR CHANGING SYSTEM INFORMATION, AND APPARATUS THEREFOR

CROSS REFERENCE TO RELATED APPLICATIONS

This application is a National Stage Patent Application of PCT International Patent Application No. PCT/KR2016/005115 (filed on May 13, 2016) under 35 U.S.C. § 371, which claims priority to Korean Patent Application Nos. 10-2015-0067628 (filed on May 14, 2015), and 10-2016-0058751 (filed on May 13, 2016), the teachings of which are incorporated herein in their entireties by reference.

TECHNICAL FIELD

The present disclosure relates to downlink information transmission and reception technology that supports low-complexity user equipment (UE) category/type for machine type communications. More particularly, the present disclosure relates to a method and apparatus for changing system information for machine type communication (MTC) user equipment.

BACKGROUND ART

Machine type communications (hereinafter referred to as "MTC") are a type of data communications, indicating machine to machine communications or object to object communications that one or more entities can perform without requiring human interaction. MTC refers to any type of communications performed without human intervention in the process of communications.

MTC user equipment may be disposed in places having a worse wireless environment than that required for typical user equipment. For MTC user equipment to operate in places having such a worse wireless environment, it may be necessary to repeatedly transmit control information and/or data of each physical channel in a plurality of subframes, instead of transmitting the same in a single subframe.

In addition, MTC user equipment may be restricted to use limited radio resources. That is, MTC user equipment may be established to only use a predetermined frequency resource or a predetermined time resource.

In this case, when system information applied to MTC user equipment is changed, MTC user equipment repeats receiving system information from all systems to update all portions of system information, unnecessarily wasting limited radio resources, which is problematic.

DISCLOSURE

Technical Problem

The present disclosure has been made in consideration of the above-described problems occurring in the related art, and the present disclosure proposes a method and apparatus for efficiently changing system information, the method and system being able to solve the problem of newly receiving information for an entire system.

In addition, the present disclosure proposes a method and apparatus for selectively identifying and receiving changed system information (SI) blocks, thereby preventing radio resources from being wasted through unnecessary repeated reception of information.

Technical Solution

According to an aspect of the present disclosure, provided is a method of changing system information by machine type communication (MTC) user equipment. The method may include: receiving system information block (SIB) 1bis provided for MTC user equipment; confirming whether or not system information is changed using at least one of a system information (SI) count value and SI change identifier information included in the SIB 1bis; and receiving one or more SI messages including the changed system information.

According to another aspect of the present disclosure, provided is a method of changing system information of MTC user equipment by a base station. The method may include: establishing a SI count value and SI change identifier information; transmitting SIB 1bis provided for MTC user equipment, the SIB 1bis including the SI count value and the SI change identifier information; and transmitting changed system information on one or more SI messages specified by the SI change identifier information.

According to another aspect of the present disclosure, provided is MTC user equipment for changing system information. The MTC user equipment may include: a receiver configured to receive SIB 1bis provided for the MTC user equipment; and a controller configured to confirm whether or not system information is changed using at least one of a SI count value and SI change identifier information included in the SIB 1bis. The receiver may further receive one or more SI messages including the changed system information.

According to another aspect of the present disclosure, provided is a base station for changing system information of MTC user equipment. The base station may include: a controller configured to establish a SI count value and SI change identifier information; and a transmitter configured to transmit SIB 1bis provided for MTC user equipment, the SIB 1bis including the SI count value and the SI change identifier information. The transmitter may further transmit changed system information on one or more SI messages specified by the SI change identifier information.

Advantageous Effects

According to the present disclosure as set forth above, the MTC user equipment may selectively receive and update changed system information, thereby preventing unnecessary transmission of system information from being repeated.

In addition, according to the present disclosure, it is possible to selectively repeat receiving specific system information to reduce the power consumption of the MTC user equipment and reduce unnecessary wastage of radio resources, thereby improving the performance of entire networks.

DESCRIPTION OF DRAWINGS

FIG. 5 illustrates an exemplary configuration of an SI 1bis message according to the first embodiment of the present disclosure;

FIG. 7 illustrates an exemplary configuration of an SI 1bis message according to the second embodiment of the present disclosure;

FIG. 9 illustrates an exemplary configuration of an SI 1bis message according to the third embodiment of the present disclosure;

MODE FOR INVENTION

Figure 1:
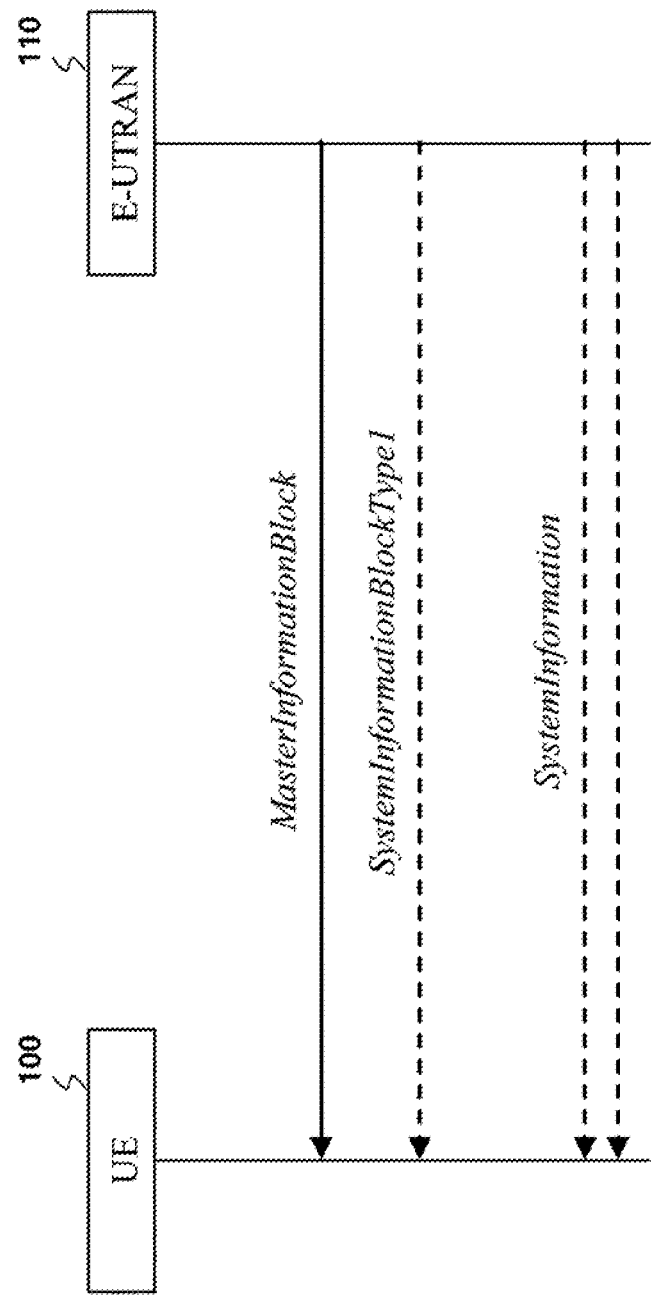
FIG. 1 illustrates a transmission procedure for system information.

Hereinafter, specific embodiments of the present disclosure will be described in detail with reference to illustrative drawings. Throughout this document, reference should be made to the drawings, in which the same reference numerals and symbols will be used to designate the same or like components. In the following description of the present disclosure, detailed descriptions of known functions and components incorporated herein will be omitted in the case that the subject matter of the present disclosure may be rendered unclear thereby.

Herein, machine type communications (MTC) user equipment (UE) may refer to user equipment supporting a low cost strategy (or low complexity) or user equipment supporting coverage enhancement. In addition, herein, the MTC user equipment may refer to user equipment supporting both the low cost strategy (or low complexity) and coverage enhancement. Alternatively, the MTC user equipment used herein may refer to user equipment defined as a specific category for supporting low cost strategy (or low complexity) and/or coverage enhancement.

In this specification, the MTC user equipment may refer to a newly-defined 3$^{rd}$ generation partnership project (3GPP) Release 13 low cost (or low complexity) UE category/type user equipment performing MTC-related operations on the basis of long-term evolution (LTE). Alternatively, the MTC user equipment may refer to a UE category/type user equipment defined in the existing 3GPP Release 12 or previous versions that support improved coverage, compared to typical LTE coverage or support low-power consumption or a newly-defined Release 13 low cost (or low complexity) UE category/type user equipment.

Wireless communications systems according to the present disclosure are widely deployed to provide a wide range of communications services, such as a voice service and a packet data service. Wireless communications systems include user equipment (UE) and base stations (BSs) (e.g., evolved node Bs (eNBs)). As used in the specification, the term "user equipment" should be interpreted as having a comprehensive meaning indicating a wireless communications user equipment, including not only user equipment used in wideband code division multiple access (WCDMA), long-term evolution (LTE), high speed packet access (HSPA), and the like, but also all of a mobile station (MS), a user terminal (UT), a subscriber station (SS), a wireless device, and the like, used in the global system for mobile communications (GSM).

A base station or cell typically refers to a station that communicates with user equipment. Such a base station or cell may also be referred to using any other term, such as a node B, an evolved node B (eNB), a sector, a site, a base transceiver system (BTS), an access point (AP), a relay node, a remote ratio head (RRH), a radio unit (RU), a small cell, or the like.

Herein, the base station or cell should be interpreted as being a comprehensive term indicating a partial area or function covered by a base station controller (BSC) in CDMA, a node B in WCDMA, an eNB or a sector (or site) in LTE, or the like. In addition, the base station or cell comprehensively indicates a variety of coverage areas, such as a mega cell, a macro cell, a microcell, a picocell, a femtocell, and communications ranges of a relay node, an remote radio head (RRH), an radio unit (RU), and a small cell.

A variety of cells as stated above are controlled by base stations, respectively, which may be interpreted in two senses. Each of the base stations i) may be an apparatus itself that provides a mega cell, a macro cell, a microcell, a picocell, a femtocell, or a small cell in relation to a wireless communications area, or ii) may indicate the wireless communications area itself. In i), entire apparatuses providing wireless areas are controlled by the same entity or entire apparatuses interacting with one another to form a wireless area in a coordinated manner may refer to base stations. An eNB, an RRH, an antenna, an RU, a low power node (LPN), a point, a transceiver point, a transmission point, a reception point, and the like form embodiments of the base station, depending on the configuration of the wireless area. In ii), the wireless area itself in which a signal is received or transmitted may refer to a base station, in terms of a user or an adjacent base station.

Thus, the mega cell, the macro cell, the microcell, the picocell, the femtocell, the small cell, the RRH, the antenna, the RU, the LPN, the point, the eNB, the transceiver point, the transmission point, and the reception point collectively refer to the base stations.

Herein, the user equipment and the base station comprehensively refer to two types of transmission/reception entities for realizing technologies or technical concepts described herein and are not limited by terms or words that are explicitly defined. The user equipment and the base station are comprehensively used as two (uplink or downlink) transmission/reception entities for realizing technologies or technical concepts described herein and are not limited by terms or words that are explicitly defined. Here, the term "uplink (UL)" relates to data transmission/reception in which data is transmitted from the user equipment to the base station, whereas the term "downlink (DL)" relates to data transmission/reception in which data is transmitted from the base station to the user equipment.

There are no limitations in multiple access technologies applied to the wireless communications system. A variety of multiple access methods, such as code division multiple access (CDMA), time division multiple access (TDMA), frequency division multiple access (FDMA), orthogonal frequency division multiple access (OFDMA), OFDM-FDMA, OFDM-TDMA, and OFDM-CDMA, may be used. An exemplary embodiment of the present disclosure is applicable for the allocation of resources in asynchronous wireless communications evolving into LTE and LTE-Advanced through GSM, WCDMA, and high-speed packet access (HSPA) and synchronous wireless communications evolving into CDMA, CDMA-2000, and ultra mobile broadband (UMB). The present disclosure should not be interpreted as being limited or restricted to a specific field of wireless communications and should be interpreted as covering all technical fields to which the concept of the present disclosure is applicable.

Uplink (UL) transmission and downlink (DL) transmission may employ time division duplex (TDD) or frequency division duplex. In the TDD, transmission is performed at different fractions of time. In the FDD, a transmission is performed at different frequencies.

In addition, a system such as LTE or LTE-Advanced forms standards by forming an uplink and a downlink, based on a single carrier wave or a pair of carrier waves. The uplink and the uplink transmit control information through a control channel, such as a physical downlink control channel (PDCCH), a physical control format indicator channel (PCFICH), a physical hybrid-ARQ indicator channel (PHICH), a physical uplink control channel (PUCCH), and an enhanced physical downlink control channel (EPDCCH). In addition, the uplink and the downlink are constituted of a data channel, such as a physical downlink shared channel (PDSCH) or a physical uplink shared channel (PUSCH), to transmit data.

In addition, control information can be transmitted using an enhanced or extended PDCCH (EPDCCH).

Herein, the cell may refer to coverage of a signal transmitted from a transmission point or a transmission/reception point, a component carrier having the coverage of the signal transmitted from the transmission point or the transmission/reception point, or the transmission point or the transmission/reception point.

The wireless communications system to which embodiments are applied may be a coordinated multi-point transmission/reception (CoMP) system, in which two or more transmission/reception points transmit a signal in a coordinated manner, a coordinated multi-antenna transmission system, or a coordinated multi-cell communications system. The CoMP system may include at least two multi-transmission/reception points and user terminals.

The multi-transmission/reception points may be a base station or a macro cell (hereinafter referred to as an "eNB") and at least one RRH connected to the eNB via a fiber optic cable or an optical fiber and controlled by wires. The RRH has high transmission power, or has low transmission power within the area of the macro cell.

Hereinafter, the downlink refers to communications from each multi-transmission/reception point to user equipment or a path for such communications. The uplink refers to communications from the user equipment to the multi-transmission/reception point or a path for such communications. In the DL, a transmitter may be a portion of the multi-transmission/reception point, and a receiver may be a portion of the user equipment. In the UL, the transmitter may be a portion of the user equipment, and the receiver may be a portion of the multi-transmission/reception point.

Hereinafter, when a signal is transmitted/received via a channel, such as the PUCCH, PUSCH, PDCCH, EPDCCH, or physical PDSCH, it may be described that "a PUCCH, PUSCH, PDCCH, EPDCCH, or PDSCH is transmitted/received."

In addition, hereinafter, transmitting or receiving a PDCCH or transmitting or receiving a signal on the PDCCH may refer to transmitting or receiving an EPDCCH or transmitting or receiving a signal on the EPDCCH.

That is, the PDCCH described hereinafter indicates the PDCCH or the EPDCCH, or is used in the sense of including both the PDCCH and the EPDCCH.

For the convenience of explanation, the EPDCCH may be applied as an embodiment of the present disclosure to the portion described as the PDCCH, and the PDCCH may be applied, as an embodiment of the present disclosure, to the portion described as the EPDCCH.

In the meantime, higher layer signaling described hereinafter includes radio resource control (RRC) signaling to transmit RRC information including an RRC parameter.

The eNB performs downlink transmission to user equipment. The eNB can transmit a physical downlink shared channel (PDSCH), which is a main channel for unicast transmission, and a physical downlink control channel (PDCCH), on which downlink control information, such as scheduling necessary for the reception of the PDSCH, and scheduling approval information for transmission on an uplink data channel (e.g. a physical uplink shared channel (PUSCH)) are transmitted. Hereinafter, the transmission of a signal on each channel will be described as the transmission of the corresponding channel.

According to a method and apparatus for transmitting and receiving downlink radio signals using a radio channel between a base station and user equipment defined in existing 3GPP LTE/LTE-Advanced systems, RRC-connected user equipment can obtain scheduling information regarding broadcast/multicast traffic, such as a system information block (SIB), a random access response (RAR), and a paging message, transmitted from a corresponding cell, as well as unicast traffic for the corresponding user equipment, by monitoring a common search space (CSS) and a UE-specific search space (USS) configured through a PDCCH or an EPDCCH, i.e. a downlink control channel of all downlink subframes (or all downlink subframes configured in a DRX on period when DRXs are established in the user equipment). This consequently means that the user equipment can receive a broadcast/multicast message and a unicast message through any downlink subframe.

Specifically, the 3GPP TS 36.213 document can be referred to for a CSS configuration method for transmitting scheduling information regarding a broadcast/multicast message for any user equipment device in a PDCCH or EPDCCH transmitted on a downlink subframe, as well as a USS configuration method for transmitting scheduling information regarding a unicast message.

Low Complexity UE Category/Type for MTC Operation

In response to the spread of LTE and LTE-Advanced networks, mobile communications providers want to minimize the number of radio access terminals (RATs) to reduce maintenance costs for networks. On the other hand, typical MTC products based on GSM/GPRS networks are increasing, and MTC terminals using low data rates can be provided at low cost. Thus, when an LTE/LTE-Advanced network is used for typical data transmissions and a GSM/GPRS network is used for MTC user equipment, mobile communications providers have a problem in that they must operate two RATs. This is also problematic for mobile communications providers in terms of profit and efficiency, since frequency bandwidths are used inefficiently.

To solve this problem, inexpensive MTC user equipment using GSM/EGPRS networks must be substituted for MTC user equipment using LTE/LTE-Advanced networks. In this regard, a variety of requirements for reducing the price of LTE/LTE-Advanced MTC user equipment are being discussed. In addition, a variety of functions are being researched in order to satisfy the requirements under discussion. Thus, the necessity of defining a low complexity user equipment (UE) category/type by reflecting a variety of requirements for reducing the price of LTE MTC user equipment has been proposed.

In addition, about 20% of MTC user equipment supporting MTC services, such as smart metering, is disposed in a deep indoor environment. For successful MTC data transmissions, the coverage of LTE MTC user equipment must be improved by about 15 dB from the coverage of typical LTE/LTE-Advanced user equipment. In addition, additionally considering a degree of performance reduced by the above-described technology, the coverage of LTE MTC user equipment must be improved by 15 dB or more.

To improve the coverage of LTE/LTE-Advanced MTC user equipment while reducing the cost thereof, the development of a variety of technologies for robust transmissions, such as PSD boosting, low-rate coding, and time domain repetition, is required.

Specifically, low complexity UE category/type requirements for MTE operations are as follows:
Reduced UE bandwidth of 1.4 MHz in downlink and uplink.
  Bandwidth reduced UEs should be able to operate within any system bandwidth.
  Frequency multiplexing of bandwidth reduced UEs and non-MTC UEs should be supported.
  The UE only needs to support 1.4 MHz RF bandwidth in downlink and uplink.
Reduced maximum transmit power.
Reduced support for downlink transmission modes.
Further UE processing relaxations
  Reduced maximum transport block size for unicast and/or broadcast signaling.
  Reduced support for simultaneous reception of multiple transmissions.
  Relaxed transmit and/or receive EVM requirement including restricted modulation scheme. Reduced physical control channel processing (e.g. reduced number of blind decoding attempts).
  Reduced physical data channel processing (e.g. relaxed downlink HARQ time line or reduced number of HARQ processes).
  Reduced support for CQI/CSI reporting modes.
Target a relative LTE coverage improvement—corresponding to 15 dB for FDD—for the UE category/type defined above and other UEs operating delay tolerant MTC applications with respect to their respective nominal coverage.
Provide power consumption reduction for the UE category/type defined above, both in normal coverage and enhanced coverage, to target ultra-long battery life:

Hereinafter, for convenience of explanation, the low complexity UE category/type having enhancement coverage, satisfying the above-described conditions for MTC operations, will simply be referred to as MTC user equipment. It should understood, however, that this term is given for convenience of explanation but is not intended to be limiting.

System Information Transmission

FIG. 1 illustrates a procedure for transmitting system information.

System information includes a master information block (MIB) and a plurality of system information blocks (SIBs).

In S101, user equipment 100 receives an MIB from a base station 110. The MIB includes essential information and has a period of 40 ms. The MIB is transmitted to subframe #0 of a radio frame, with SFN mod 4=0. For the other radio frames, transmission of the MIB is repeated in subframe #0.

Subsequently, in S102, the user equipment 100 receives SIB 1 from the base station 110. SIB 1 has a period of 80 ms, and SIB1 is repeatedly transmitted within the period of 80 ms. That is, transmission is performed in subframe #5 of the radio frame with SFN mod 8=0, and transmission is repeated in subframe #5 for a radio frame with SFN mod 2=0.

In S103, the user equipment 100 may receive the other SIBs except for SIB 1. The other SIB messages (e.g. SIB 2, 3, 4, . . . ), except for SIB 1, are transmitted on system information (SI) messages. Mapping information regarding SI messages of the SIBs is included in SIB 1. When SIB 1 is received, the user equipment 100 may recognize points in time at which the other SIBs are to be transmitted. Each of the SIBs is included in a single SI message. A single SI message may include a plurality of SIBs having the same period. A plurality of SI messages may have the same period. SI messages are transmitted within SI windows, with a single SI message being associated with an SI window. A single SI message can be transmitted within a single SI window. Transmission of the SI message can be freely repeated within the SI window.

System Information Change

System information can be changed by the information change determination of a base station or a core network. A change in system information may occur in a specific radio frame. A network establishes a modification period, and within the corresponding period, broadcasts system information having the same content. When the network changes at least one portion of system information, the network notifies user equipment of the change in the system information in the present modification period and then broadcasts changed system information in the modification period. The user equipment, which received the notification regarding the change in the system information from the network, receives the changed new system information directly after the beginning of the next modification period.

Figure 2:
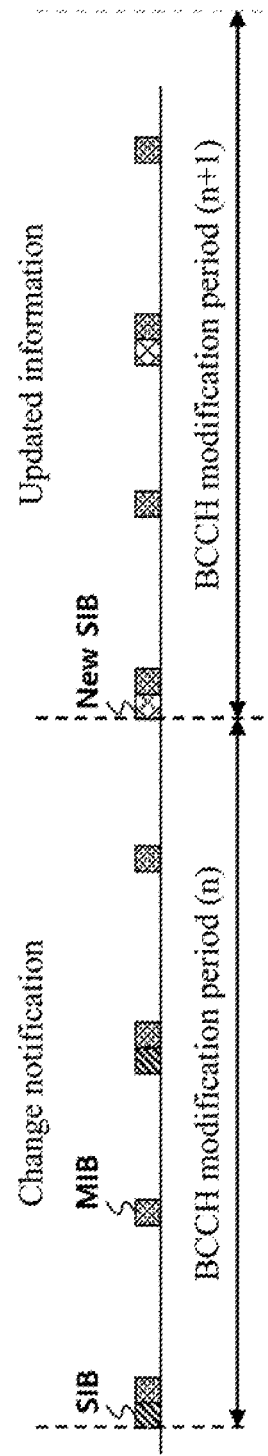
FIG. 2 illustrates a procedure for changing system information.

FIG. 2 illustrates a procedure for changing system information.

Referring to FIG. 2, a base station notifies user equipment of a change in system information in a modification period (n) and transmits changed system information to the user equipment in a modification period (n+1). That is, the user equipment may receive SIBs and an MIB in the modification period (n) while receiving New SIBs, i.e. updated system information, in the modification period (n+1). In FIG. 2, for convenience of explanation, SIB information is illustrated as being changed by way of example, and transmission periods of the SIBs and the MIB are illustrated as being randomly established. A boundary, at which the changed system information is transmitted, is defined by SFN mod m=0, with the value of m being established in SIB 2.

In addition, the base station may notify the user equipment of the change in the system information using a paging message. When the user equipment receives the paging message including SI modification (systemInfoModification) information, all system information is newly received from the start point of the next modification period. That is, even when only one portion of system information is changed, the user equipment must newly receive all portions of system information and apply the received system information thereto.

Here, SIB 1 may include a system information (SI) count value. The SI count value is a value counted when SIBs are modified. Such a SI count value may be included in a specific field of SIB 1. For example, the SI count value may be included as a "systemInfoValueTag" information element (IE). When the network changes the SIBs, the "systemInfoValueTag" IE allows a corresponding value to be updated simultaneously, so that the user equipment can recognize a change in the SIBs by only comparing the corresponding value. For example, when the user equipment returns to a coverage from outside of the coverage, the user equipment determines whether or not SIBs are valid (i.e. the same) by comparing the "systemInfoValueTag" value of SIB 1, which is being broadcast, with the corresponding value possessed thereby. The "systemInfoValueTag" value may not be updated when ETWS information, CMAS information, time information (e.g. SIB 8 or SIB 16), EAB parameters, or the like is changed.

When the user equipment confirms that the system information is changed, the user equipment must newly receive all portions of system information. The above-described MTC user equipment must repeat receiving downlink data in a predetermined number of times ranging from tens of times to hundreds of times. Thus, when a typical system information changing procedure is used even when a portion of the system information is changed, receiving all portions of the system information is required to be repeated in a predetermined number of times. This reception procedure may consume a large amount of time for information update and lead to power wastage by the user equipment.

To overcome these problems, the present disclosure provides a specific procedure for efficiently changing system information for MTC user equipment. In particular, the present disclosure causes the MTC user equipment not to repeat the operation of unnecessarily receiving all SIBs whenever system information is changed, so that the system information can be efficiency received. In addition, it is possible to prevent power from being wasted by preventing the MTC user equipment from unnecessarily receiving the same SIB as that possessed thereby.

Hereinafter, SIB 1, newly designed for MTC user equipment based on existing SIB 1, will be referred to as SIB 1bis. However, embodiments of the present disclosure are not limited thereto. For example, the SIB 1bis may be used as having the same meaning as "SystemInformationBlock-Type1-BR." That is, the SIB1 bis may be referred to by a variety of other terms indicating the SIB 1 that the MTC user equipment receives.

Figure 3:
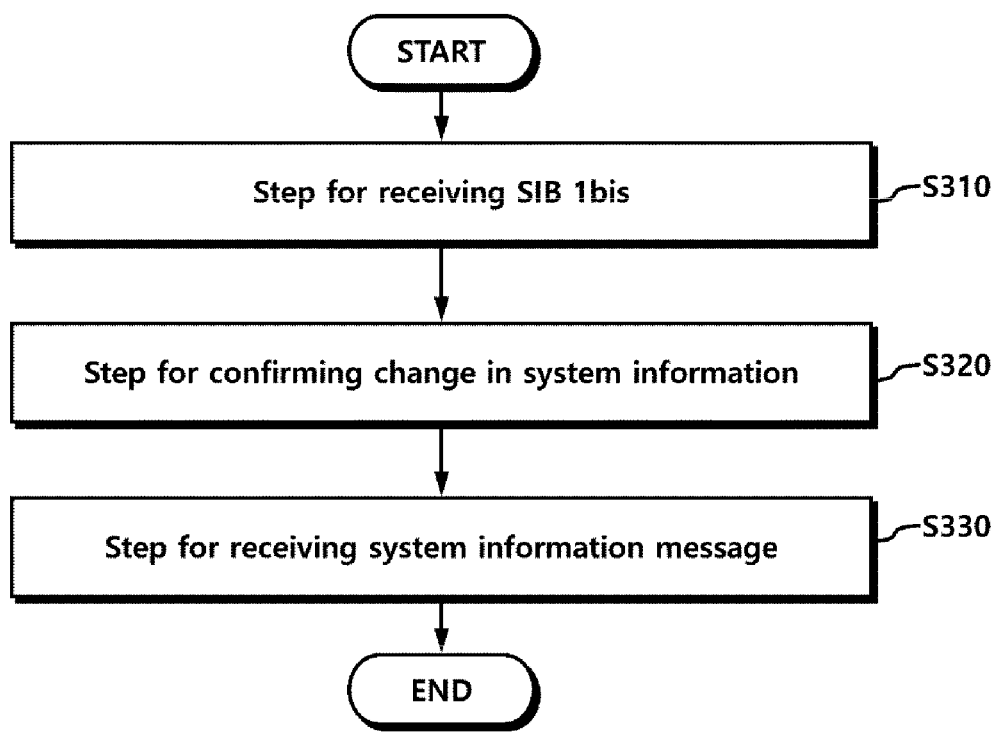
FIG. 3 illustrates operations of user equipment according to an embodiment of the present disclosure.

FIG. 3 illustrates operations of user equipment according to an embodiment of the present disclosure.

A method of changing system information by MTC user equipment according to an embodiment of the present disclosure includes the steps of: receiving SIB (SIB) 1bis provided for MTC user equipment; confirming whether or not system information is changed using at least one of a system information (SI) count value and SI change identifier information included in the SIB 1bis; and receiving one or more SI messages including the changed system information.

Referring to FIG. 3, the MTC user equipment receives the SIB 1bis from a base station (S310). The MTC user equipment may receive the SIB 1bis from the base station in a predetermined period. The SIB 1bis may include at least one of the SI count value and the SI change identifier information.

The MTC user equipment confirms whether or not the system information is changed using at least one of the SI count value and the SI change identifier information of the SIB 1bis received in the predetermined period (S320). For example, the MTC user equipment may confirm whether or not the system information is changed by comparing the SI count value (e.g. "systemInfoValueTag") with a SI count value stored in a previous modification period. Alternatively, the MTC user equipment may confirm whether or not the system information is changed by examining the SI change identifier information. Alternatively, the MTC user equipment may confirm whether or not the system information is changed by examining both the SI count value and the SI change identifier information. The confirmation of whether or not the system information is changed may mean a procedure of confirming whether or not the system information is changed or which portion of the system information (e.g. which SIB or which SI message) is changed. That is, the MTC user equipment may confirm whether or not the system information is changed and/or can confirm which system information is changed.

For example, the MTC user equipment, may confirm whether or not the system information is changed by comparing whether the SI count value of previously-received SIB 1bis with the SI count value of currently-received SIB 1bis. When the SI count values are equal, the MTC user equipment may confirm that the system information is not changed. In contrast, when the SI count values have a difference of 1 or more, the MTC user equipment may confirm that the system information is changed. When the MTC user equipment continuously monitors SI count values, a corresponding SI count value may be increased by 1 from the previous SI count value. On the other hand, when the MTC user equipment newly enters the coverage of the base station that the MTC user equipment exited, the system information may be changed two times. In this case, the SI count values may have a difference of 2 or more.

In another example, the MTC user equipment may confirm the changed system information by examining the SI change identifier information. That is, the MTC user equipment may confirm which SIB is changed, based on the SI change identifier information. Alternatively, the MTC user equipment may confirm which SI message is changed, based on the SI change identifier information.

In another example, the MTC user equipment may sequentially confirm whether or not the system information is changed by examining the SI count value and which system information (e.g. SIB or SI message) is changed by examining the SI change identifier information.

As described above, the MTC user equipment may confirm whether or not the system information is changed or which system information is changed by a variety of methods.

Afterwards, the MTC user equipment may receive at least one SI message including the changed system information (S330). For example, when the system information is confirmed as being changed, the MTC user equipment may newly receive changed system information in a following modification period. As described above, in the related art, when a change in system information is confirmed based on a paging message, the user equipment newly receives all portions of the system information and applied the received system information thereto. However, the MTC user equipment according to the present disclosure may confirm which system information is changed, based on the SI change identifier information. Thus, the MTC user equipment may selectively receive changed system information that is specified by the SI identifier information. This may consequently prevent the wastage of power and radio resources necessary for re-receiving unchanged system information.

In this regard, the SI identifier information may include SI change identification information (i.e. information identifying whether or not system information is changed) for one or more SI messages. That is, the SI identifier information may identify a change in system information for each SIB or for each SI message. Since SI messages may respectively include one or more SIBs, when a specific SIB is confirmed as being changed, only an SI message including the changed SIB may be received.

As described above, when system information is changed in the MTC user equipment, the base station according to the present disclosure notifies the user equipment of which system information is changed, using SIB 1bis, so that the user equipment may selectively receive the changed system information. In addition, the base station notifies the user equipment of which SIB or which SI message is repeatedly transmitted for enhanced coverage support using the SIB 1bis, so that the MTC user equipment may selectively receive system information adequate thereto.

Hereinafter, more specific embodiments of the above-described present disclosure will be described with reference to the drawings.

First Embodiment: Method of Adding SIB Bitmap to SIB 1bis

SI change identifier information, having the form of a bitmap, may be transmitted on SIB 1bis. For example, the base station may notify which SIB is changed, in comparison to the previous SIB 1bis, by adding an SIB bitmap to the SIB 1bis.

For example, the SIB bitmap included in SIB 1bis may be configured as follows.

Each bit string may be mapped to each SIB or SI message. For example, when SIB 1bis contains scheduling information of a total of nine SIBs, such as SIB 2bis, SIB 3bis, . . . , and SIB 10bis, the SIB bitmap may be composed of nine-bit strings, which may indicate, from the left, SIB 2bis, SIB 3bis, . . . , and SIB 10bis. When the SIB bitmap is 111000001, this may indicate the SIBs changed at this time are SIB 2bis, SIB 3bis, . . . , and SIB 10bis.

Alternatively, the number of SIBs may be configured to be different from the number of bit strings. In this case, a single bit string may indicate a plurality of SIBs. For example, eight-bit strings may be used to indicate, from the left, SIB 2bis, SIB 3bis, . . . , SIB 8bis, and the other SIB(s), which are nine or more SIBs.

Alternatively, the SIB bitmap may have more bit strings than the present SIBs to be reserved for one or more SIBs that are to be added later.

After the user equipment receives the SIB 1bis, the user equipment may selectively receive changed system information by examining the changed SIB based on the bitmap information.

Figure 4:
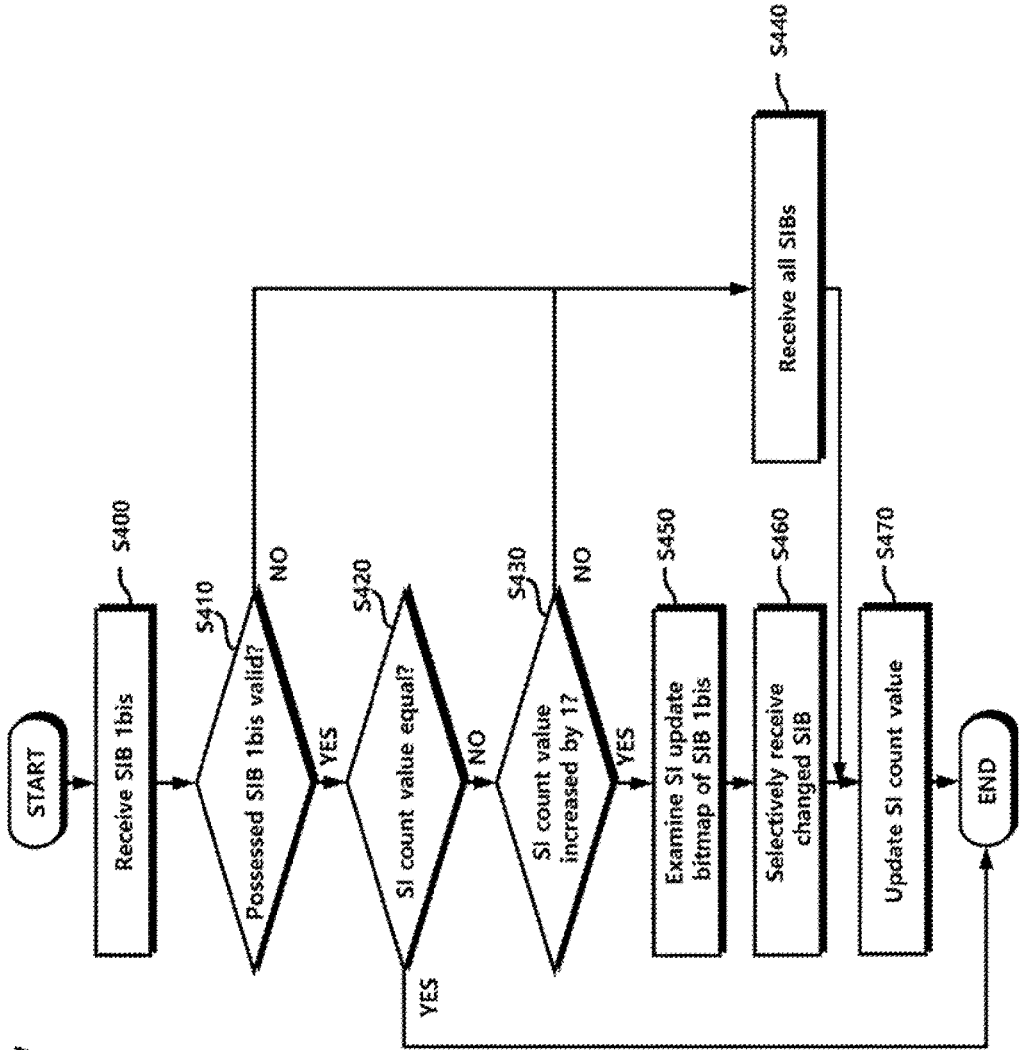
FIG. 4 illustrates a first embodiment of the present disclosure.

FIG. 4 illustrates a procedure for changing system information according to a first embodiment of the present disclosure.

Referring to FIG. 4, a procedure for changing system information using the above-described SIB bitmap will be described.

The MTC user equipment receives SIB 1bis (S400). The SIB 1bis may include scheduling information of SIBs that the MTC user equipment must receive. The SIB 1bis may be received in a predetermined period.

The MTC user equipment determines the validity of SIB 1bis that is previously received and stored therein (S410). That is, the MTC user equipment determines whether or not the stored SIB 1bis is valid.

When the SIB 1bis, previously received and stored, is valid, the MTC user equipment determines whether or not the SI count value (e.g. systemInfoValueTag) of the stored SIB 1bis is equal to a newly-received SI count value (e.g. systemInfoValueTag) by comparing the SI count values (S420). When the stored SIB 1bis is not valid, the MTC user equipment receives all SIBs (S440).

When the SI count values are equal, the MTC user equipment confirms that the system information is not changed and ends the system information changing procedure.

When the SI count values are not equal, the MTC user equipment determines whether or not the currently-received SI count value is increased by 1 from the previously-received SI count value (S430). When the newly-received SI count value (e.g. systemInfoValueTag) is greater than the stored SI count value (e.g. systemInfoValueTag) by 1, an SIB bitmap (e.g. systemInfoUpdateBitmap) is examined (S450).

The MTC user equipment receives SI messages by selecting changed SIBs, based on the examination of the SIB bitmap (S460).

When the newly-received SI count value (e.g. systemInfoValueTag) is neither greater, by 1, than nor equal to the stored SI count value (e.g. systemInfoValueTag), the stored system information is discarded and all portions of the system information are newly received (S440).

When all portions of the system information are received, the MTC user equipment updates the SI count value (e.g. systemInfoValueTag) with a newly-received value (S470).

The above-described operations allow SIBs or SI messages including updated system information to be selectively received.

FIG. 5 illustrates an exemplary configuration of a system information 1bis message according to the first embodiment of the present disclosure.

Referring to FIG. 5, SIB bitmap information as described above may be added to a systemInfoUpdateBitmap field of an SIB 1bis message. Although the size of the field is illustrated as being 10 in FIG. 5, the size may be set to have a variety of values, as described above.

Alternatively, the SIB bitmap may be configured using specific or all bits of the SI count value (e.g. systemInfoValueTag). For example, 24 bits of upper bit strings of systemInfoValueTag may be used as systemInfoValueTag, while 8 bits of lower bit strings of systemInfoValueTag may be used as the SIB bitmap.

Second Embodiment: Addition of updateTag to SIB 1bis According to SIB or SI Message SI change identifier information may include information indicating a change according to one or more SI messages. Alternatively, the SI change identifier information may include information indicating a change in each SIB. Specifically, a base station may inform a change in the SIB or SI message by adding updateTag information about each SIB or each SI message to SIB 1bis.

For example, updateTag may be added as the SI change identifier information to a SchedulingInfo field of SIB 1bis. Such updateTag includes information indicating a change in each SIB or each SI message. The updateTag may be referred to as a variety of other terms, such as si-changeIndication. For example, the information indicating a change in each SIB or each SI message may be referred to by a variety of other terms, such as "systemInfoValueTag-SI" and "updateTag." Although the term updateTag will be used hereinafter for convenience of explanation, this is not intended to be limiting.

The updateTag, included in the SIB 1bis, is transmitted together with scheduling information of each SIB or each SI message. The updateTag may be set to have a value of 1 bit or more. For example, updateTag, set to 1 bit and having a value corresponding to 1, indicates that the corresponding SIB or SI message is changed. Thus, the user equipment receives the corresponding SIB or SI message. When the updateTag is 0, the corresponding SIB or SI message is the same as the previous version and thus may not be received again. Alternatively, when the updateTag value is different from a value stored in the user equipment, it may be determined the SIB or SI message is changed. Alternatively, the updateTag may be set to 2 bits or more to indicate each SIB or SI message.

The updateTag, an SI change identifier, may be included in the SIB or SI message only in the case in which the SIB or SI message is changed. That is, the updateTag present in the SchedulingInfo field of the SIB or SI message may indicate that the SIB or SI message is changed, while no updateTag may indicate that the SIB or SI message is not changed.

After the user equipment receives the SIB 1bis, the user equipment may only receive the changed SIB or SI message by recognizing updateTag of SchedulingInfo field information.

Figure 6:
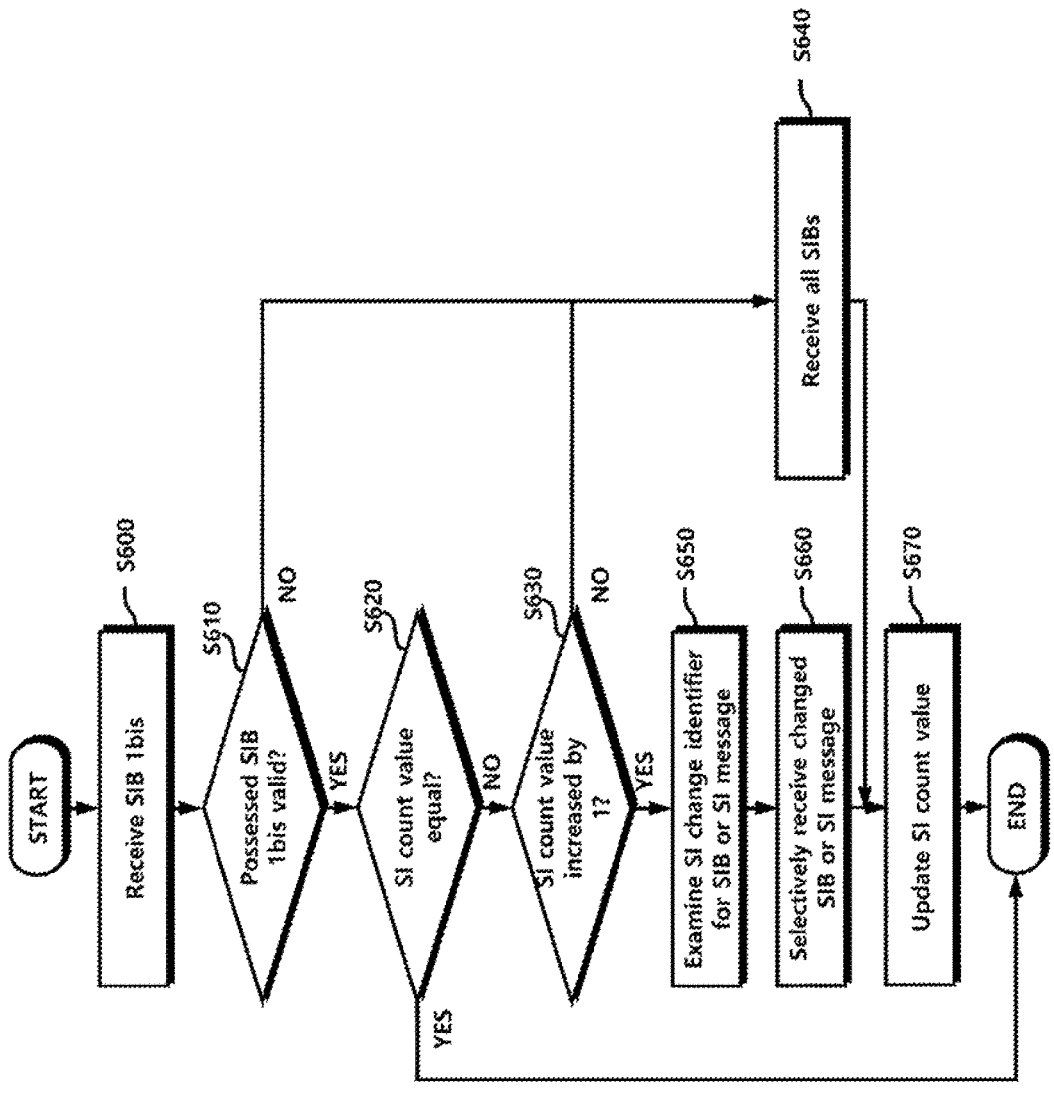
FIG. 6 illustrates a second embodiment of the present disclosure.

FIG. 6 illustrates a procedure of changing system information in accordance with a second embodiment of the present disclosure.

Referring to FIG. 6, the MTC user equipment according to the present disclosure receives SIB 1bis (S600). The SIB 1bis includes scheduling information of SIBs that the MTC user equipment must receive. The SIB 1bis may be received in a predetermined period.

The MTC user equipment determines the validity of the SIB 1bis that is previously received and stored therein (S610). That is, the MTC user equipment determines whether or not the stored SIB 1bis is valid.

When the SIB 1bis, previously received and stored, is valid, the MTC user equipment determines whether or not the SI count value (e.g. systemInfoValueTag) of the stored SIB 1bis is equal to a newly-received SI count value (e.g. systemInfoValueTag) by comparing the SI count values (S620). When the stored SIB 1bis is not valid, the MTC user equipment receives all SIBs (S640).

When the SI count values are equal, the MTC user equipment determines that the system information is not changed and ends the system information changing procedure.

When the SI count values are not equal, the MTC user equipment determines whether or not the currently-received SI count value is increased by 1 from the previously-received SI count value (S630). When the newly-received SI count value (e.g. systemInfoValueTag) is greater than the stored SI count value (e.g. systemInfoValueTag) by 1, SI change identifier information (e.g. updateTag) is examined (S650). For example, the user equipment determines a changed SIB or SI message by examining the SI change identifier information (e.g. updateTag) for each SIB or each SI message, the SI change identifier information indicating a change in the SIB or SI message.

When the changed SIB or SI message is determined based on the examination of the SI change identifier information, the MTC user equipment selectively receives the SIB or SI message (S660).

When the newly-received SI count value (e.g. systemInfoValueTag) is neither greater, by 1, than nor equal to the stored SI count value (e.g. systemInfoValueTag), the stored system information is discarded and all portions of the system information are newly received (S640).

When all portions of the system information are received, the MTC user equipment updates the SI count value (e.g. systemInfoValueTag) with a newly-received value (S470).

The above-described operations allow SIBs or SI messages including updated system information to be selectively received, thereby preventing reception of unnecessary (or equal) system information from being repeated.

FIG. 7 illustrates an exemplary configuration of an SI 1bis message according to the second embodiment of the present disclosure.

FIG. 7 illustrates a case in which above-described SI change identifier information is included in the schedulingInfoList field of the SIB 1bis. As illustrated in FIG. 7, a updateTag, SI change identifier information, may be added to as an information element of the schedulingInfoList field. The updateTag may be established to have a value of 1 bit or 2 or more bits. When the SI change identifier information indicates a change in each SI message, the SI change identifier information may be included as an si-changeIndication information element in each field of the SIB 1bis.

Third Embodiment: Method of EC Support Indication of SIB or SI Message

SIB 1bis may include indication information in scheduling information of the other SIBs except for the SIB 1bis, the indication information indicating whether or not the corresponding SIB is repeatedly transmitted for enhanced coverage (EC) user equipment. That is, the SI change identifier information may include information indicating whether or not each SIB is repeatedly transmitted for the EC user equipment.

For example, when EC support indication information of the SIB or SI message is set to 1, transmission of the SIB for EC is repeated in an SI window. Repeated transmission in the SI window may be performed in predefined subframes (e.g. all subframes or even/odd subframes) or may be separately scheduled through an EPDCCH. When repeated transmission indication information of the SIB is set to 0, the SIB may be transmitted once in the SI window or general repeated transmission thereof may be performed. General repeated transmission may be performed in predetermined subframes (e.g. even/odd subframes or third, sixth, and ninth subframes) or may be separately scheduled through the EPDCCH.

The EC user equipment selectively receives SIBs or SI messages, the EC support indication of which is set to 1, based on the scheduling information of the SIB 1bis.

Figure 8:
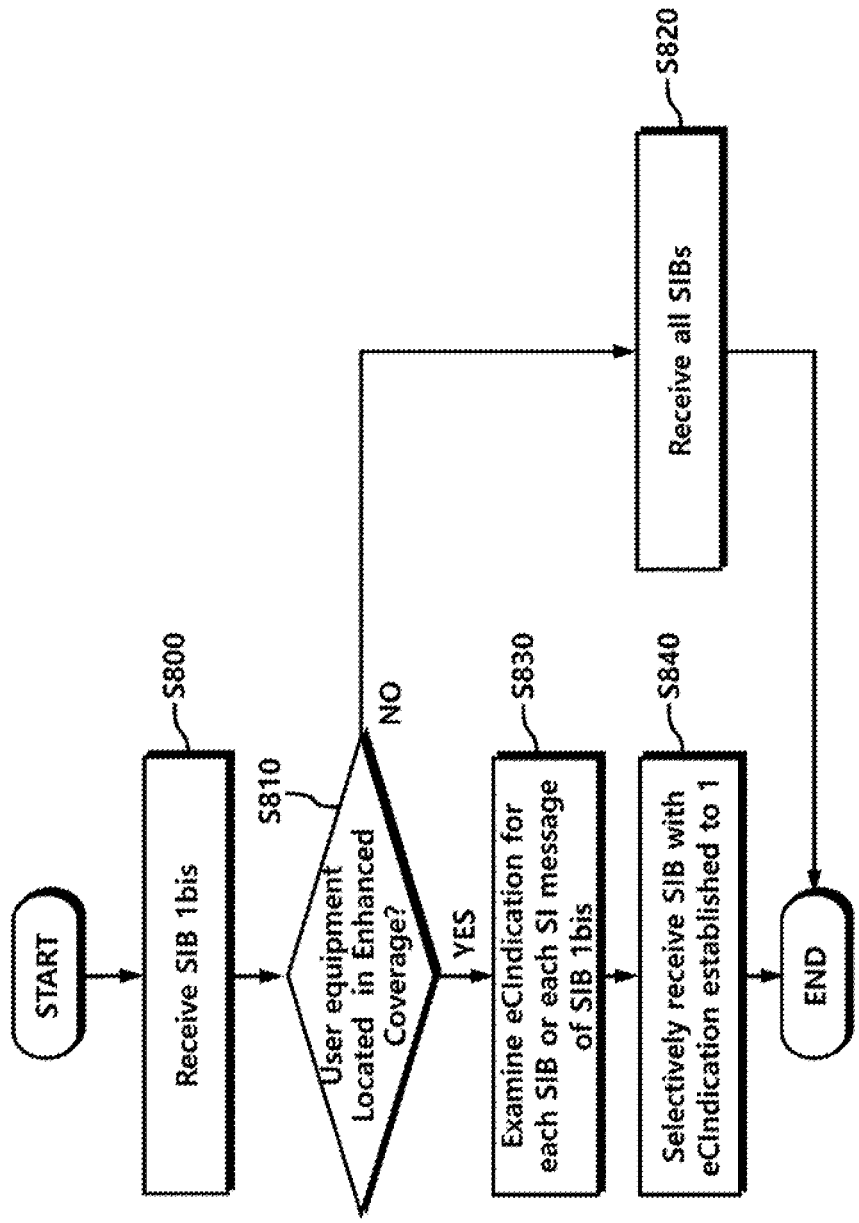
FIG. 8 illustrates a third embodiment of the present disclosure.

FIG. 8 illustrates a procedure of changing system information in accordance with a third embodiment of the present disclosure.

Referring to FIG. 8, the MTC user equipment receives SIB 1bis (S800). As described above, the SIB 1bis may be received in a predetermined period. The SIB 1bis may include, for example, scheduling information of SIBs that the MTC user equipment must receive.

The MTC user equipment determines whether or not the MTC user equipment is located in an EC (S810). The MTC user equipment, located in the EC, examines eCIndication for each SIB or SI message of the received SIB 1bis (S830). When the MTC user equipment is not located in the EC, all SIBs are received (S820). That is, the MTC user equipment may determine whether or not to selectively receive SIBs by preferentially determining whether or not the MTC user equipment is located in the EC in which repeated transmission is necessary.

The MTC user equipment receives SIBs or SI messages, the value of which is set to 1, based on the examination of eCIndication (S840). When the MTC user equipment is located in a normal coverage instead of being in the EC, the MTC user equipment receives all SIBs or SI messages regardless of eCIndication (S820).

FIG. 9 illustrates an exemplary configuration of an SI 1bis message according to the third embodiment of the present disclosure.

FIG. 9 illustrates a case in which the above-described SI change identifier information is included in the scheduling-InfoList field of SIB 1bis. As illustrated in FIG. 9, an eCIndication, SI change identifier information, may be included as an information element of the schedulingInfo-List field. The eCIndication may be set to have a value of 1 bit or 2 or more bits.

The above-described EC support indication may indirectly notify EC support for the user terminal by adding scheduling information about repeated transmission for EC support to scheduling information of the SIB or SI message.

The exemplary embodiments as described above may be applied separately, or at least portions of the methods thereof may be combined with each other. Although the SIB bis message for the MTC user equipment has been described by way of example, the SIB bis message is not limited to applications for the MTC user equipment but is applicable to legacy SIBs.

Figure 10:
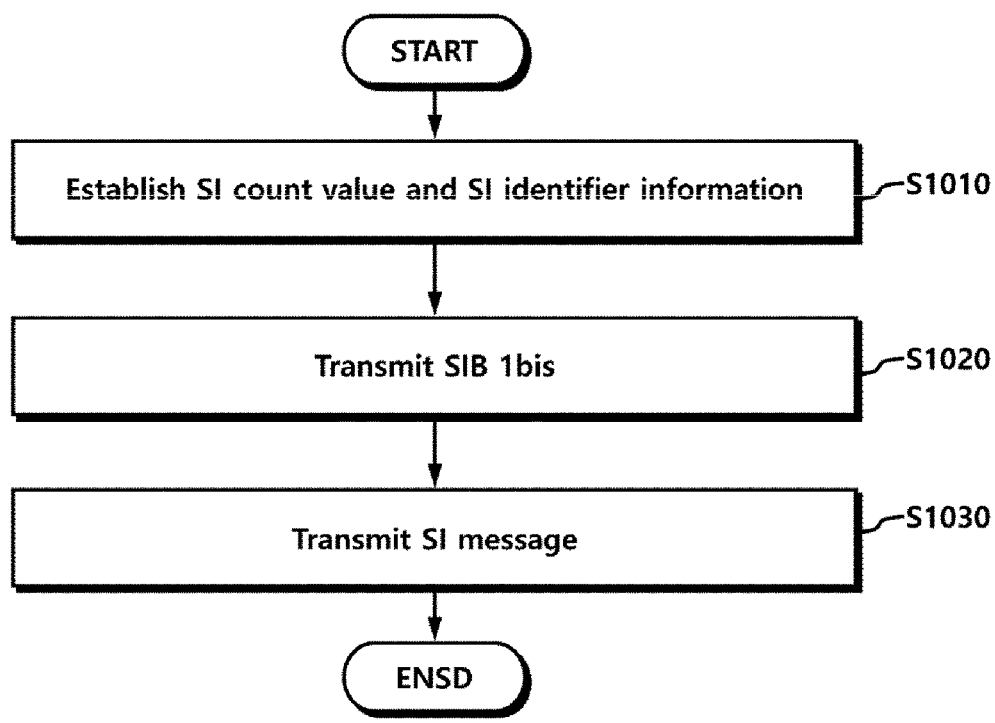
FIG. 10 illustrates operations of a base station according to another embodiment of the present disclosure.

FIG. 10 illustrates operations of a base station according to an embodiment of the present disclosure.

A method of changing system information of MTC user equipment by a base station according to the present disclosure may include the steps of: establishing an SI count value and SI change identifier information; transmitting SIB 1bis provided for MTC user equipment, including the SI count value and the SI change identifier information; and transmitting changed system information on one or more SI messages specified by the SI change identifier information.

Referring to FIG. 10, the base station may establish an SI count value and SI change identifier information (S1010). For example, the base station generates SIB 1bis to be periodically transmitted to the MTC user equipment and establishes the SI count value and the SI change identifier information that are included in the SIB 1bis. The SI count value may be established to increase by 1 when the system information is changed while remaining equal when the system information is the same as previous system information. Alternatively, the SI change identifier information may include information indicating an SIB or SI message including changed system information. Alternatively, the SI change identifier information may include information indicating a change in system information according to one or more SI messages. In this regard, the SI change identifier information may be set to have a value of 1 bit or 2 or more bits.

In addition, the base station may transmit the SIB 1bis provided for the MTC user equipment, including the SI count value and the SI change identifier information, based on whether or not the system information is changed (S1020). For example, the base station may periodically transmit the SIB 1bis. The SIB 1bis may include not only the SI count value and the SI change identifier information, but also scheduling information of SIBs except for the SIB 1bis.

The base station may transmit the changed system information on one or more SI messages specified by the SI change identifier information (S1030). For example, the base station may transmit the SIB or SI messages including the changed system information. The SI messages including the changed system information are specified by above-described SI change identifier information. The MTC user equipment may apply the changed system information by selectively receiving SI messages specified by the SI change identifier information.

For example, the MTC user equipment may confirm whether or not the system information is changed by comparing the SI count value stored in the MTC user equipment with the SI count value included in the SIB 1bis. That is, as described above in the foregoing first to third embodiments, it is possible to confirm whether or not the system information is changed, based on the SI count value.

When it is confirmed that the system information is changed based on the SI count value, the MTC user equipment may examine one or more SI messages including the changed system information by examining the SI change identifier information. For example, the MTC user equipment may receive the SIBs or SI messages by confirming whether or not the system information thereof is changed by using SIB bitmap information as in the first embodiment, using updateTag information as in the second embodiment, or examining eCIndication information as in the third embodiment.

Accordingly, in the case of changing the system information of the MTC user equipment, the base station may efficiently transmit the changed system information to the MTC user equipment while reducing unnecessary wastage of radio resources.

According to the present disclosure as set forth above, the MTC user equipment may selectively receive and update changed system information, thereby preventing transmission of system information from being unnecessarily repeated. In addition, the MTC user equipment may selectively repeat receiving specific system information to reduce power consumption and reduce unnecessary wastage of radio resources, thereby improving the performance of entire networks.

Hereinafter, the user equipment and the base station, in which all of the operations according to the present disclosure described with reference to FIGS. 1 to 10 may be performed, will be described again.

Figure 11:
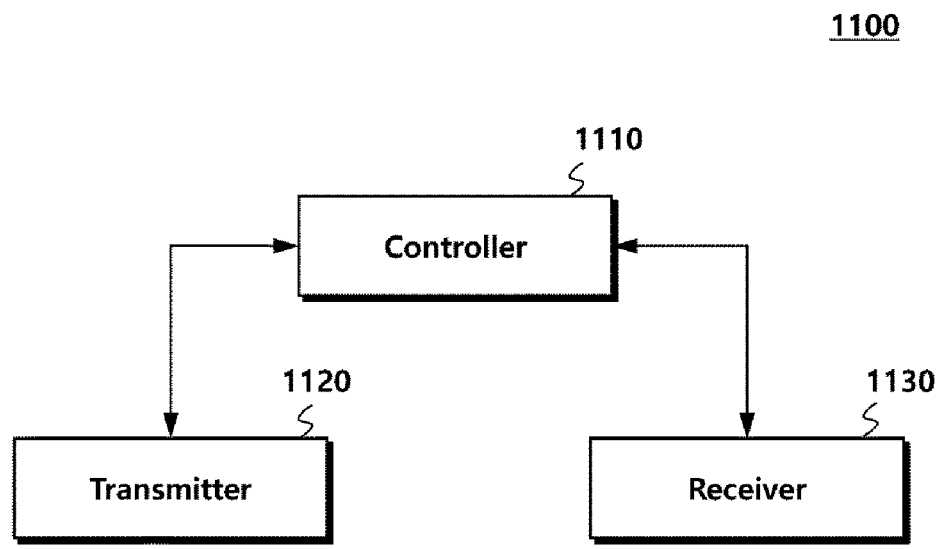
FIG. 11 illustrates configuration of user equipment according to another embodiment of the present disclosure.

FIG. 11 illustrates configuration of user equipment according to an embodiment of the present disclosure.

Referring to FIG. 11, the MTC user equipment 1100 includes a receiver 1130 for receiving SIB 1bis provided for the MTC user equipment and a controller 1110 for confirming whether or not system information is changed using at least one of an SI count value and SI change identifier information included in the SIB 1bis.

In addition, the receiver 1130 may further receive one or more SI messages including the changed system information.

The controller 1110 may confirm whether or not the system information is changed by comparing the SI count value, stored in the MTC user equipment according to the first to third embodiments, with the SI count value included in the SIB 1bis.

In addition, when a change in the system information is confirmed based on the SI count value, the controller 1110 may examine one or more SI messages including the changed system information by examining the SI change identifier information. The SI change identifier information may specify the changed system information according to SIBs or SI messages. The MTC user equipment may selectively receive SI messages specified by the SI identifier information, instead of receiving all portions of the system information, by examining the SI identifier information.

In addition, as is necessary for embodying the present disclosure as described above, the controller 1110 controls the overall operation of the user equipment to allow the MTC user equipment to selectively receive changed system information.

In addition, the receiver 130 receives downlink control information, data, and messages from the base station through corresponding channels. In addition, the transmitter 1120 transmits uplink control information, data, and messages to the base station through corresponding channels.

Figure 12:
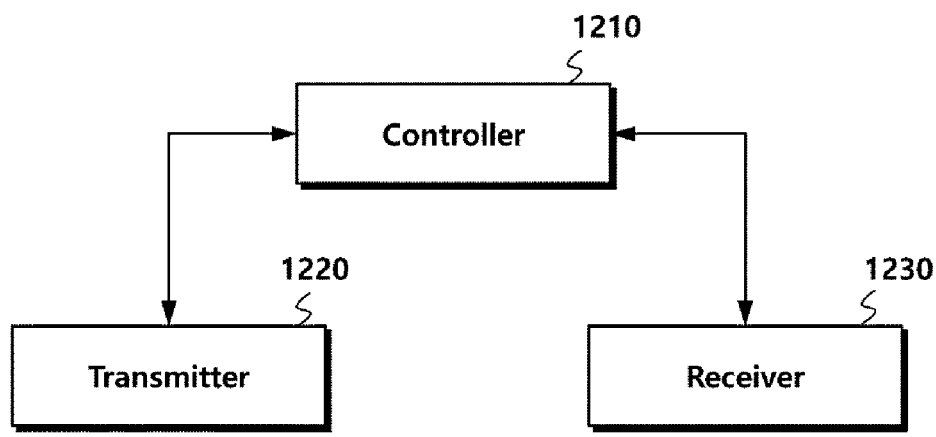
FIG. 12 illustrates configuration of a base station according to another embodiment of the present disclosure.

FIG. 12 illustrates configuration of a base station according to an embodiment of the present disclosure.

Referring to FIG. 12, the base station 1200 includes a controller 1210 for establishing an SI count value and SI change identifier information and a transmitter 1220 for transmitting SIB 1bis provided for the MTC user equipment, including the SI count value and the SI change identifier information.

In addition, the transmitter 1220 may transmit changed system information on one or more SI messages specified by the SI change identifier information.

When the system information provided for the MTC user equipment is changed, the controller 1210 updates the SI count value indicating a change in the system information. In addition, when only a portion of the system information is changed, the controller 1210 may establish the SI change identifier information for specifying SIBs or SI messages including the changed system information. The MTC user equipment may confirm whether or not the system information is changed by receiving the SI count value and the SI change identifier information and may specify the SIBs or SI messages including the changed system information.

The transmitter 1220 may transmit the SIB 1bis, including the established SI count value and SI change identifier information, to the MTC user equipment. The SIB 1bis may include scheduling information of the SIBs, except for the SIB 1bis.

In addition, the controller 1210 controls the overall operation of the base station 1200, in association with the MTC user equipment selectively receiving the changed system information necessary for embodying the present disclosure to change the system information.

In addition, the transmitter 1220 and the receiver 1230 are used to transmit and receive signals, messages, and data, necessary for embodying the present disclosure, to and from the MTC user equipment.

The foregoing descriptions and the accompanying drawings have been presented in order to explain the certain principles of the present disclosure. A person skilled in the art to which the present disclosure relates may make many modifications and variations by combining, dividing, substituting for, or changing the elements without departing from the principle of the present disclosure. The foregoing embodiments disclosed herein shall be interpreted as illustrative only but not as limitative of the principle and scope of the present disclosure. It should be understood that the scope of the present disclosure shall be defined by the appended Claims and all of their equivalents fall within the scope of the present disclosure.

The invention claimed is:

1. A method of changing system information by machine type communication (MTC) user equipment, the method comprising:

receiving system information block (SIB) 1bis provided for MTC user equipment;

confirming whether or not system information is changed using a system information (SI) count value and SI change identifier information included in the SIB 1bis; and receiving one or more SI messages including the changed system information, wherein the confirming whether or not the system information is changed comprise comparing an SI count value stored in the MTC user equipment with the SI count value included in the SIB 1bis.

2. The method according to claim 1, wherein the SI change identifier information includes information indicating a change according to the one or more SI messages.

3. The method according to claim 1, wherein the one or more SI messages including the changed system information are specified by the SI change identifier information.

4. The method according to claim 1, wherein the confirming whether or not the system information is changed comprises, when the change in the system information is conformed based on the SI count value, examining the one or more SI messages including the changed system information by examining the SI change identifier information.

5. A method of changing system information of machine type communication (MTC) user equipment by a base station, the method comprising:

establishing a system information (SI) count value and SI change identifier information;

transmitting system information block (SIB) 1bis provided for MTC user equipment, the SIB 1bis including the SI count value, and the SI change identifier information; and transmitting changed system information on one or more SI messages specified by the SI change identifier information, wherein the MTC user equipment determines whether or not the system information is changed by comparing an SI count value stored in the MTC user equipment with the SI count value included in the SIB 1bis.

6. The method according to claim 5, wherein, when the change in the system information is conformed based on the SI count value, the MTC user equipment examines the one or more SI messages including the changed system information by examining the SI change identifier information.

7. The method according to claim 5, wherein the SI change identifier information includes information indicating a change according to the one or more SI messages.

8. The method according to claim 5, wherein the SI change identifier information is set to have a value of 2 bits.

9. Machine type communication (MTC) user equipment for changing system information, comprising:

a receiver configured to receive system information block (SIB) 1bis provided for the MTC user equipment; and a controller configured to confirm whether or not system information is changed using a system information (SI) count value and SI change identifier information included in the SIB 1bis, wherein the receiver further receives one or more SI messages including the changed system information, and wherein the controller confirms whether or not the system information is changed by comparing an SI count value stored in the MTC user equipment with the SI count value included in the SIB 1bis.

10. The MTC user equipment according to claim 9, wherein the one or more SI messages including the changed system information are specified by the SI change identifier information.

11. The MTC user equipment according to claim 9, wherein, when the change in the system information is conformed based on the SI count value, the controller examines the one or more SI messages including the changed system information by examining the SI change identifier information.

12. The MTC user equipment according to claim 9, wherein the SI change identifier information includes information indicating a change according to the one or more SI messages.

* * * * *